UNITED STATES PATENT OFFICE.

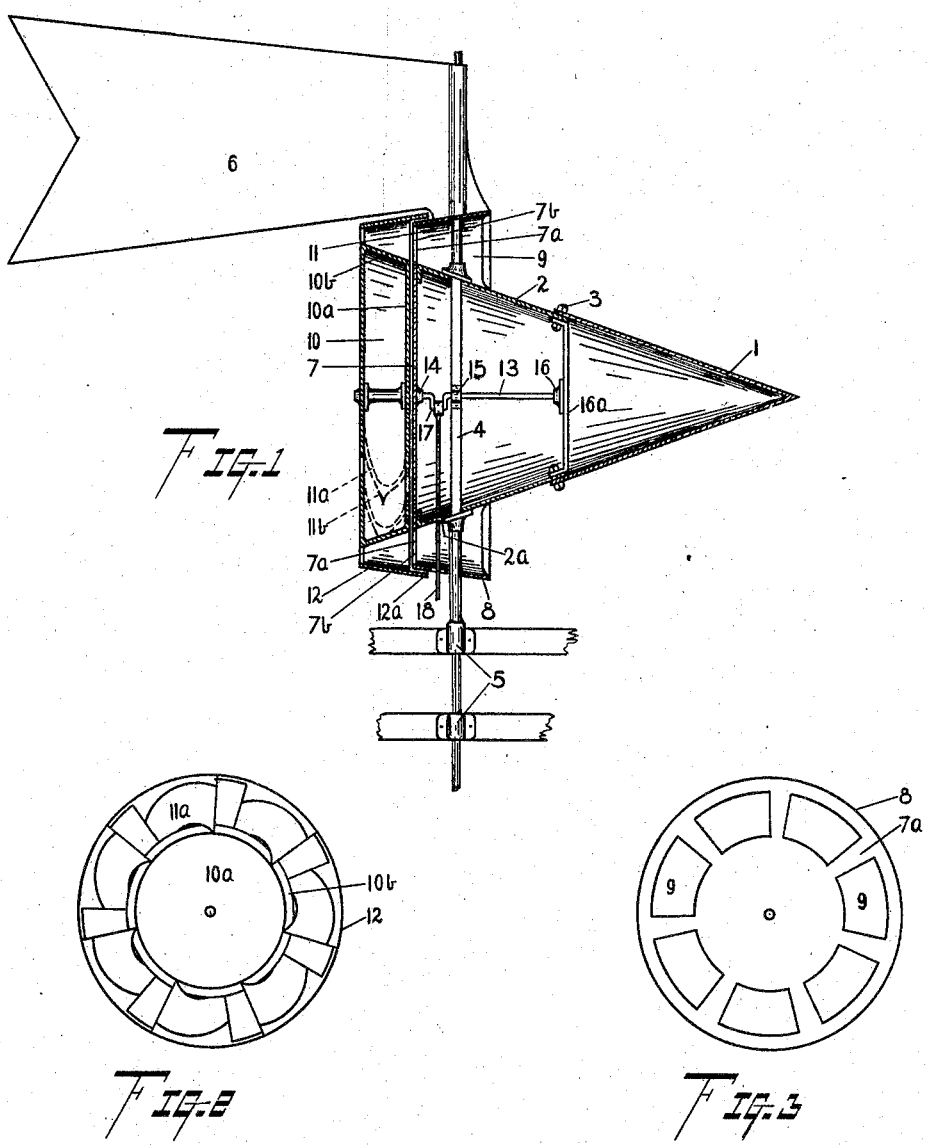

GEORGE E. FELDNER, OF BAY CITY, MICHIGAN.

WINDMILL.

981,077. Specification of Letters Patent. Patented Jan. 10, 1911.

Application filed September 6, 1910. Serial No. 580,501.

*To all whom it may concern:*

Be it known that I, GEORGE E. FELDNER, a citizen of the United States, residing at Bay City, in the county of Bay and State of Michigan, have invented certain new and useful Improvements in Windmills; and I do hereby declare the following to be a full, clear, and exact description of the invention, such as will enable others skilled in the art to which it appertains to make and use the same.

This invention relates to wind mills and pertains more particularly to wind mills of the type in which stationary guiding vanes are employed to deflect the wind currents against the vanes of a revolving wind wheel.

The improvement consists in certain constructions and combinations of parts whereby the objects of my invention are attained.

These objects are, first, to provide a wind mill of great strength and durability, having means for rigidly supporting the wind mill shaft and the mechanism connected thereto, and second, to provide means whereby the on-coming wind is deflected from the central axis of the wind mill out toward the periphery where it is received in pockets or chutes by which it is delivered against the revolving wheel in a blast that from its main characteristic may be described as a rapidly whirling cylinder of air.

My invention also comprises means whereby this whirling cylinder of air is made to rotate the wind wheel shaft from which power may be taken in the ordinary way.

With these and certain other objects in view which will be more fully set forth in the specification, my invention consists in the devices illustrated in the accompanying drawings, in which—

Figure 1 is a side elevation broken away in part; Fig. 2 shows the entering vanes of the wind mill; and Fig. 3 shows the delivery vanes of the cone.

As is clearly shown in the drawings, the device consists in a cone composed of two sections, 1 being the end section adapted to point against the wind, and 2 is the enlarged or base section. The two cone sections are fastened together by means of bolts or other removable fastenings 3. The base section is supported on a post 4 being rigidly fixed thereto, the post preferably passing vertically through the cone, as shown in Fig. 1.

The post is revolubly mounted in suitable bearings 5, and at its upwardly projecting end carries a vane or tail 6 by which the cone is pointed always at the wind. The rear face 7 of the cone is preferably formed without air openings except in the part $7^a$ that projects radially beyond the base of the cone. Around the edge of the radially projecting base $7^a$ is formed a rearwardly extending and outwardly flaring rim 8, and in the space between the rim 8 and the periphery of the cone I provide a plurality of curved guiding vanes 9. At the extremity of each vane the base $7^a$ is provided with a suitable opening $7^b$ for the delivery of air to the revolving wind wheel. The wind wheel is preferably formed of an inner body 10 in the form of a short truncated cone, the small end $10^a$ being of the same diameter as the face 7 of the cone, and the outer periphery $10^b$ having the same slope as the face of the cone so as to form practically a continuation of the cone.

A plurality of suitably curved wheel vanes 11 are mounted on the outer periphery of the wheel, the vanes in turn being inclosed by an outwardly flaring rim 12, the front edge $12^a$ of which overlaps the rear edge of the stationary rim 8, there being sufficient clearance between the two rims to allow the rim 12 to revolve freely.

The wind wheel is carried on a shaft 13 and is rigidly fixed thereto. The shaft is supported by suitable bearings as 14, which may be fixed to the rear face 7 of the cone, 15 carried by the post 4, and 16 carried by a suitable brace $16^a$ which is fixed at its ends to the base section 2 of the cone. The shaft has a crank 17 adapted to operate a suitable connecting rod 18 passing through an opening $12^a$ in the base section 2 of the cone.

In operation, the point of the cone is kept headed at the wind by means of the tail 6. The wind striking the point of the cone is deflected along its sides until it enters the pocket formed between the outwardly flaring rim 8 and the wall of the base section 2. Here it is deflected by curved guiding vanes 9 and is discharged through the openings $7^b$ in a direction approximately tangential to the base of the cone, being in effect delivered as a whirling cylinder of air. This cylinder of air is delivered directly to the wind wheel, entering the space between the outer periphery $10^b$ of the wheel and the flaring rim 12.

Here the air strikes the curved wheel vanes 11, revolving the wheel after the manner of a water wheel or steam turbine.

The vanes may be of any suitable curvature adapted to the purpose, but I prefer to make them approximately of the form illustrated in Fig. 1, in which $11^a$ is the curved body of a vane and $11^b$ is a forwardly extending wing formed on the vane and adapted to project a short distance into the cup of the next vane to better insure against eddying of the air while in the pocket of the vane. It will be understood, however, that I do not desire to confine myself to any particular form of vane construction.

By the means above described, I have produced a wind mill that is simple in construction, exceedingly strong by reason of the conical form of the body, and in which all of the wind striking the cone is first deflected outwardly to the rim where it is found in practice to compress or pack to a considerable extent between the outwardly flaring rim 8 and the wall of the cone, and it here comes in contact with the stationary guiding vanes 9 and is discharged through the openings $7^b$ in the form of a rapidly whirling annular body of air that passes directly through the annular space of the wind wheel. By these means all of the air passing through the wheel is applied near the extreme periphery and no resistance is occasioned by the use of radial arms as is the case in the common form of wind mill.

Having described my invention, what I claim and desire to secure by Letters Patent, is:—

A wind mill comprising a horizontally disposed conical body, a vertical post fixed to said body, bearings revolubly supporting said post, a radially projecting base for said cone, said base having openings, an outwardly flaring rim carried by said base, curved guiding vanes mounted between said rim and cone, a revolving wind wheel comprising a conical inner body, vanes around the periphery of said body and an outwardly flaring rim inclosing said vanes and overlapping the rim carried by the cone, a crank shaft, bearings carried by the cone and receiving said shaft, and a connecting rod carried by said crank and extending outside of said cone.

In testimony whereof, I affix my signature in presence of two witnesses.

GEORGE E. FELDNER.

Witnesses:
CHRISTINE A. BRAIDEL,
GEO. W. SMITH.